United States Patent
Bergquist et al.

(10) Patent No.: US 6,763,778 B2
(45) Date of Patent: Jul. 20, 2004

(54) MOTOR VEHICLE WITH RECESSES FOR CARRYING WARNING INDICATORS

(75) Inventors: Åke Bergquist, Västra Frölunda (SE); Göran Larsson, Torslanda (SE); Anders Gunnarson, Göteborg (SE); Simon Lamarre, Västra Frölunda (SE); Karin Reikerås, Dampierre-en-Y (FR); Kjell Reikerås, Hökerum (SE); Einar Lennartsson, Sollebrunn (SE); Birgitta Thorsson, Varberg (SE)

(73) Assignee: Volvo Personvagnar AB, Gothenburg (SE)

(*) Notice: Subject to any disclaimer, the term of this patent is extended or adjusted under 35 U.S.C. 154(b) by 0 days.

(21) Appl. No.: 09/883,888

(22) Filed: Jun. 15, 2001

(65) Prior Publication Data

US 2002/0017230 A1 Feb. 14, 2002

Related U.S. Application Data

(63) Continuation of application No. PCT/SE99/02332, filed on Dec. 14, 1999.

(30) Foreign Application Priority Data

Dec. 18, 1998 (SE) .............................................. 9804431

(51) Int. Cl.[7] .................................................. B60R 1/04

(52) U.S. Cl. ...................... 116/28 R; 116/63 T; 40/591; 362/485; 362/501

(58) Field of Search ............................. 116/28 R, 63 R, 116/63 T, 63 P, 35 R; 40/588, 590–591, 643–644, 910–912; 280/770, 159; 340/463, 545.1, 471–472; 362/485, 501, 517–518

(56) References Cited

U.S. PATENT DOCUMENTS 2,844,810 A * 7/1958 Steele, Jr. ................. 340/425.5
2,918,565 A * 12/1959 Vermette .................... 362/501

(List continued on next page.)

FOREIGN PATENT DOCUMENTS

| DE | 1956025 | | 5/1971 |
| DE | 29 03 547 A1 | | 8/1980 |
| DE | 4201818 A1 | * | 7/1993 |
| DE | 196 39 664 C1 | | 4/1998 |
| GB | 2342712 | * | 4/2000 |

OTHER PUBLICATIONS

International Search Report for Application No. PCT/SE99/02332, dated Apr. 19, 2000 (mailing date).
Preliminary Examination Report for Application No. PCT/SE99/02332, dated Dec. 8, 2000 (mailing date).

*Primary Examiner*—Diego Gutierrez
*Assistant Examiner*—Tania Courson
(74) *Attorney, Agent, or Firm*—Fitch, Even, Tabin & Flannery

(57) ABSTRACT

A motor vehicle designed to carry a foldable warning triangle that can be removed from the vehicle. The vehicle has an opening defined by a boundary edge and covered by a hatch such as a trunk or hood. The hatch is arranged so that it can be moved between a closed position and an open position. The fold-up warning triangle is secured in an edge portion of the hatch that bears against the boundary edge of the opening when the hatch is in the closed position. A warning surface of the warning triangle is visible to other traffic when the hatch is opened. In a preferred embodiment, the fold-up warning triangle is releasably placed in a recess in the edge portion of the hatch. The recess has a wall interrupted by at least one hole through which the warning surface is visible to other traffic when the hatch is open.

14 Claims, 4 Drawing Sheets

U.S. PATENT DOCUMENTS

| | | | | |
|---|---|---|---|---|
| 3,175,186 A | * | 3/1965 | Barenyi | 362/464 |
| 3,582,639 A | * | 6/1971 | Chamberlain | 362/542 |
| 3,970,033 A | * | 7/1976 | Lindner et al. | 116/63 P |
| 4,054,789 A | * | 10/1977 | Romanelli | 362/80 |
| 4,303,305 A | * | 12/1981 | Jones | 350/103 |
| 4,353,111 A | | 10/1982 | Gallitzendorfer et al. | |
| 4,821,668 A | | 4/1989 | Leschke et al. | |
| 4,875,028 A | * | 10/1989 | Chou | 340/473 |
| 5,193,895 A | * | 3/1993 | Naruke et al. | 362/80 |
| 5,311,412 A | * | 5/1994 | Yang | 362/83.3 |
| 5,523,926 A | * | 6/1996 | Gold | 362/80 |
| 5,711,593 A | * | 1/1998 | Gold | 362/80 |
| 5,751,212 A | * | 5/1998 | Findley | 340/468 |
| 5,842,770 A | * | 12/1998 | Gold | 362/80 |
| 5,852,400 A | * | 12/1998 | Gold | 340/463 |
| 6,160,475 A | * | 12/2000 | Hornung et al. | 340/461 |
| 6,184,786 B1 | * | 2/2001 | Medeiros | 340/463 |
| 6,350,049 B1 | * | 2/2002 | Zimmermann et al. | 362/496 |

* cited by examiner

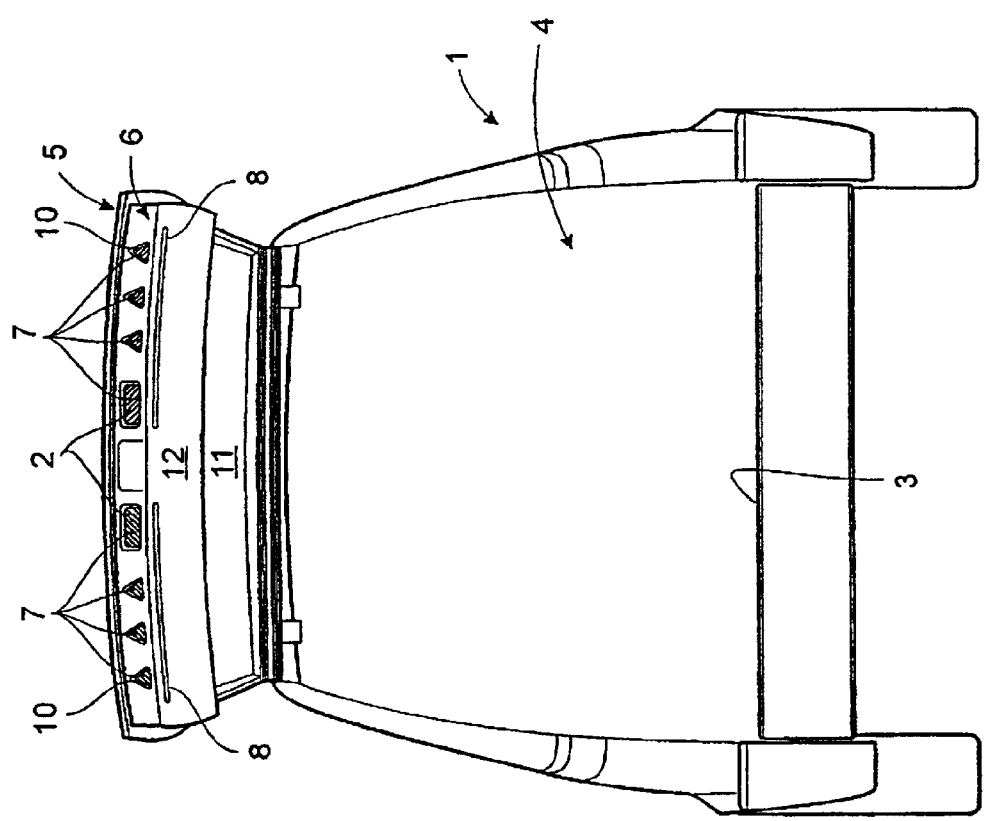

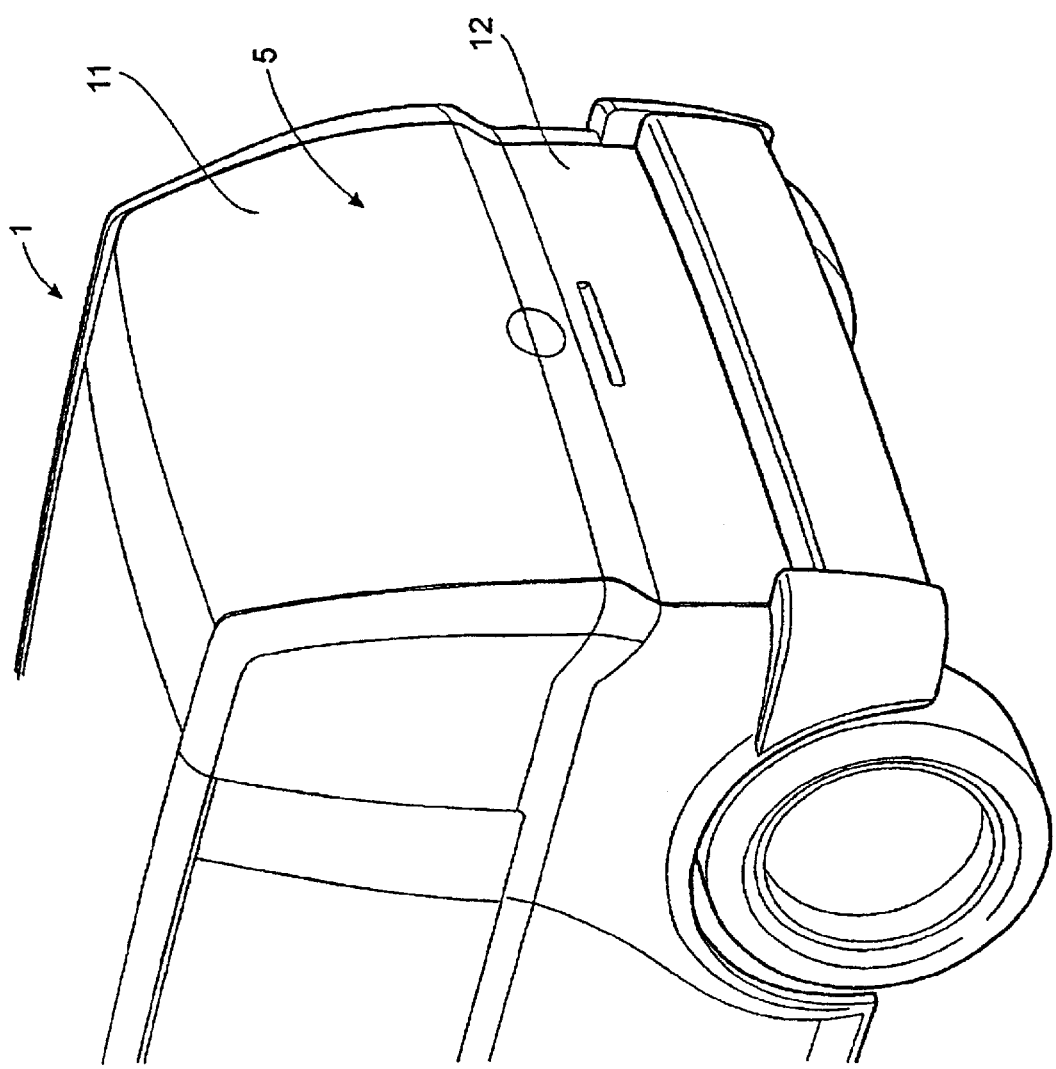

MOTOR VEHICLE WITH RECESSES FOR CARRYING WARNING INDICATORS

CROSS REFERENCE TO RELATED APPLICATIONS

The present application is a continuation of PCT Application No. PCT/SE99/02332, filed Dec. 14, 1999, which claims priority to Swedish Application No. 9804431-6, filed Dec. 18, 1998.

BACKGROUND OF THE INVENTION

1. Technical Field

The present invention relates to a motor vehicle designed to carry a fold-up warning triangle which can be removed from the vehicle. The term motor vehicle is here used in particular to signify a vehicle of the passenger car or delivery van type. The vehicle comprises an opening covered by a hatch such as a trunk hatch or engine hood. The hatch is arranged so that it can be moved between a closed position and an open position. The warning triangle is arranged in the vehicle in such a way that it gives a warning to other traffic when the hatch is in its open position.

2. Background Information

It is already known to secure a warning triangle on the inside of the rear hatch of a vehicle in such a way that the warning triangle is visible to following traffic when the rear hatch is open. Such an arrangement is described, for example, in German Patent Nos. DT 1 956 025 and DE 3 627 100. A common feature of these arrangements is that the warning triangle is secured to the inside of the hatch in such a way that its characteristic triangular shape is clearly evident to following traffic when the hatch is open. The advantages of such arrangements are obvious, as a visual warning signal is given to other traffic as soon as the hatch is opened. In addition, access to the warning triangle is made considerably easier since the warning triangle can be easily seized for the purpose of placing it on the road, even when the luggage space is full.

However, the known solutions are best suited to passenger cars of the sedan type which are equipped with a traditional trunk. Such a trunk generally has no transparent surfaces and is instead entirely covered by sheet metal or other surface material. There is therefore no problem in accommodating the whole of the fold-up triangle on the inside of the trunk. However, in vehicles such as station wagons, mini-vans and multi-purpose vehicles (MPV), the rear hatch has relatively large glazed surfaces to which attachment of a fold-up warning triangle is not possible due to visibility and road safety. The remaining, non-transparent part of the hatch often represents a small portion of the total surface area of the hatch and therefore, for reasons of space, does not permit attachment of a fold-up warning triangle. Another difficulty in applying the previously known solutions to a rear hatch of a vehicle of the multi-purpose type is that the hatch, in the open position, seldom has an inner surface substantially at right angles to the road surface on which the vehicle is standing, which is a prerequisite for the aforementioned solutions to be able to work.

SUMMARY OF THE INVENTION

The invention solves the above-mentioned problems by providing a motor vehicle designed to carry a fold-up warning triangle which can be removed from the vehicle. The vehicle has an opening defined by a boundary edge and covered by a hatch such as a trunk or hood. The hatch is arranged so that it can be moved between a closed position and an open position. The warning triangle in a folded-up position is secured in an edge portion of the hatch bearing against the boundary edge of the opening in the closed position of the hatch in such a way that a warning surface of the warning triangle is visible to other traffic when the hatch is in its open position.

In a preferred embodiment, the fold-up warning triangle is releasably fitted in a recess in the edge portion of the hatch. The recess has a wall interrupted by at least one hole through which the warning surface is visible to other traffic when the hatch is in its opened position. The hole is preferably triangle-shaped as a symbolic representation of the shape of the warning triangle in its deployed position.

The proposed solution is considerably more compact than previously known arrangements without losing sight of the main function of providing a warning to other traffic when the hatch is in its open position.

Other features and advantages of the invention will become apparent from the following description of a preferred embodiment.

BRIEF DESCRIPTION OF THE DRAWINGS

The invention will be described below on the basis of an illustrative embodiment and with reference to the attached drawings in which:

FIG. 3 shows a rear perspective view of the vehicle, where the fold-up warning triangles are in their respective recesses, and where the reflective material is visible through the holes of the recesses in the rear hatch; and FIG. 4 shows a partial, diagonal perspective view of the rear part of the vehicle when the rear hatch is in its closed position, in which the reflective warning surfaces are no longer visible from outside the vehicle.

DETAILED DESCRIPTION OF THE INVENTION

Figure 1:
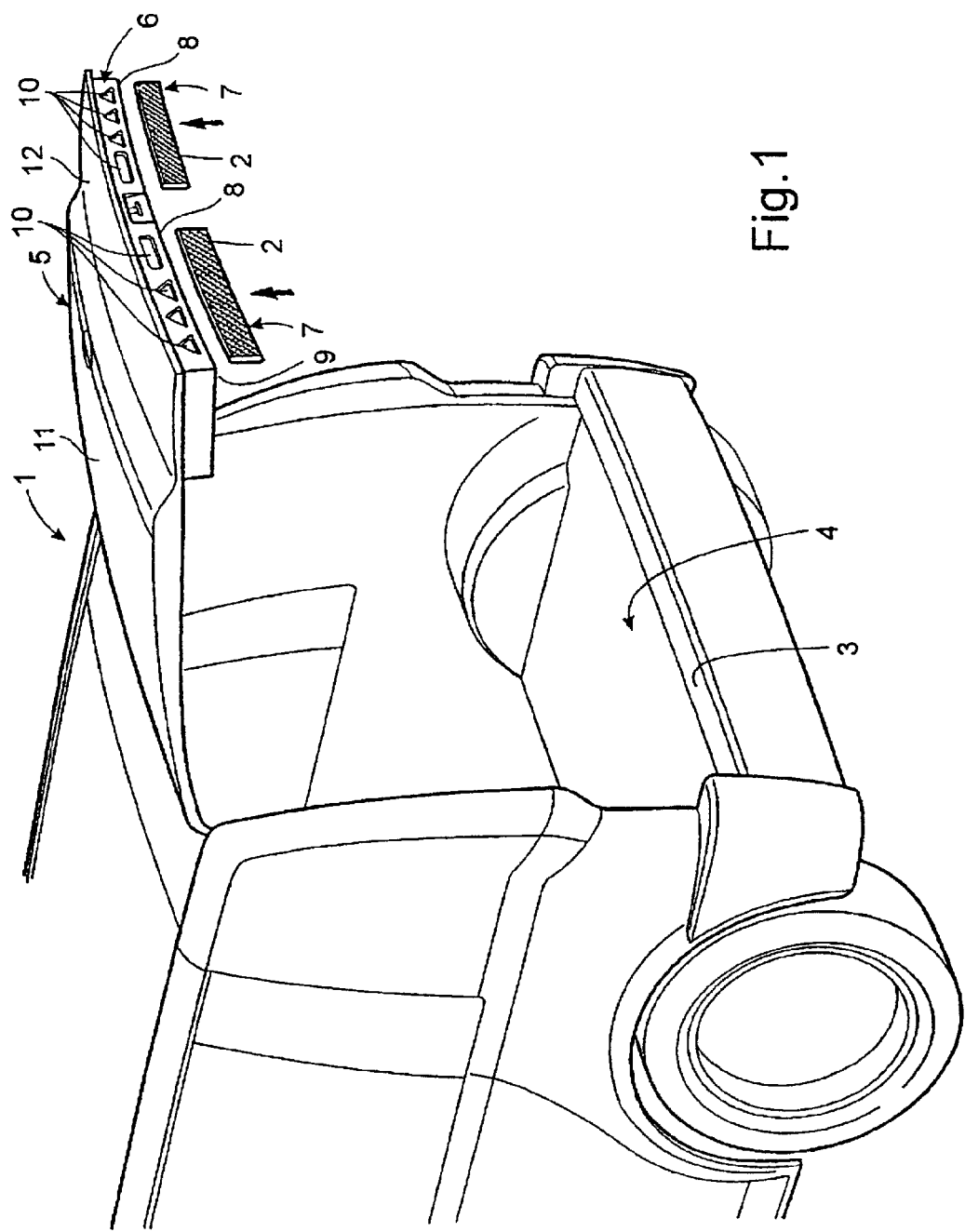
FIG. 1 shows a partial, diagonal perspective view of a motor vehicle according to the invention with two fold-up warning triangles shown just before being placed into the recessed in the rear hatch, wherein one leg of the fold-up triangle is coated completely with reflective material.

In FIG. 1, reference number 1 generally designates a motor vehicle according to the invention. The motor vehicle 1 includes station wagons, mini-vans, MPV's (multi-purpose vehicle) or SUV's (sports utility vehicle). The vehicle 1 has a rear hatch 5 which is shown in its opened position in FIG. 1. The rear hatch 5 has a glazed, transparent part 11 and an unglazed and thus untransparent part 12. The rear hatch 5 is designed to cover an opening 4 in the rear part of the vehicle. The opening 4 is defined in turn by a boundary edge 3. The rear hatch 5 also has an edge portion 6 which bears against the boundary edge 3 of the opening 4 when the rear hatch 5 is in its closed position, which is shown in FIG. 4.

In the preferred embodiment of the invention, the vehicle 1 is equipped with at least two fold-up warning triangles 2. In an alternative embodiment (not shown), the vehicle may be equipped with only one fold-up warning triangle 2. The warning triangles 2 preferably have a compact rectangular shape when folded up, as seen in FIG. 1. The warning triangle 2 consists of three legs of equal length that together form an isosceles triangle when deployed (not shown). The legs of the warning triangle 2 are substantially coated with reflective material, for example, in the form of a reflector film that is fixed to the legs of the warning triangle 2 by means such as an adhesive. The surface covered by the reflector material thus constitutes a warning surface 7. The basic concept of the invention is that the warning triangle 2, when folded up, is secured in the above-mentioned edge portion 6 of the rear hatch 5 in such a way that the warning surface 7 of the warning triangle 2 is visible to other traffic when the hatch 5 is open. FIG. 1 shows two fold-up triangles 2 just as they are about to be fitted into respective recesses. 8 in the edge portion 6 of the rear hatch 5. However, the extent of the recess 8 can best be seen from FIG. 3. The recesses 8 have outer boundary walls 9 which are interrupted by holes 10 through which the warning surface 7 is visible to other traffic when the hatch 5 is in its opened position.

Figure 2:
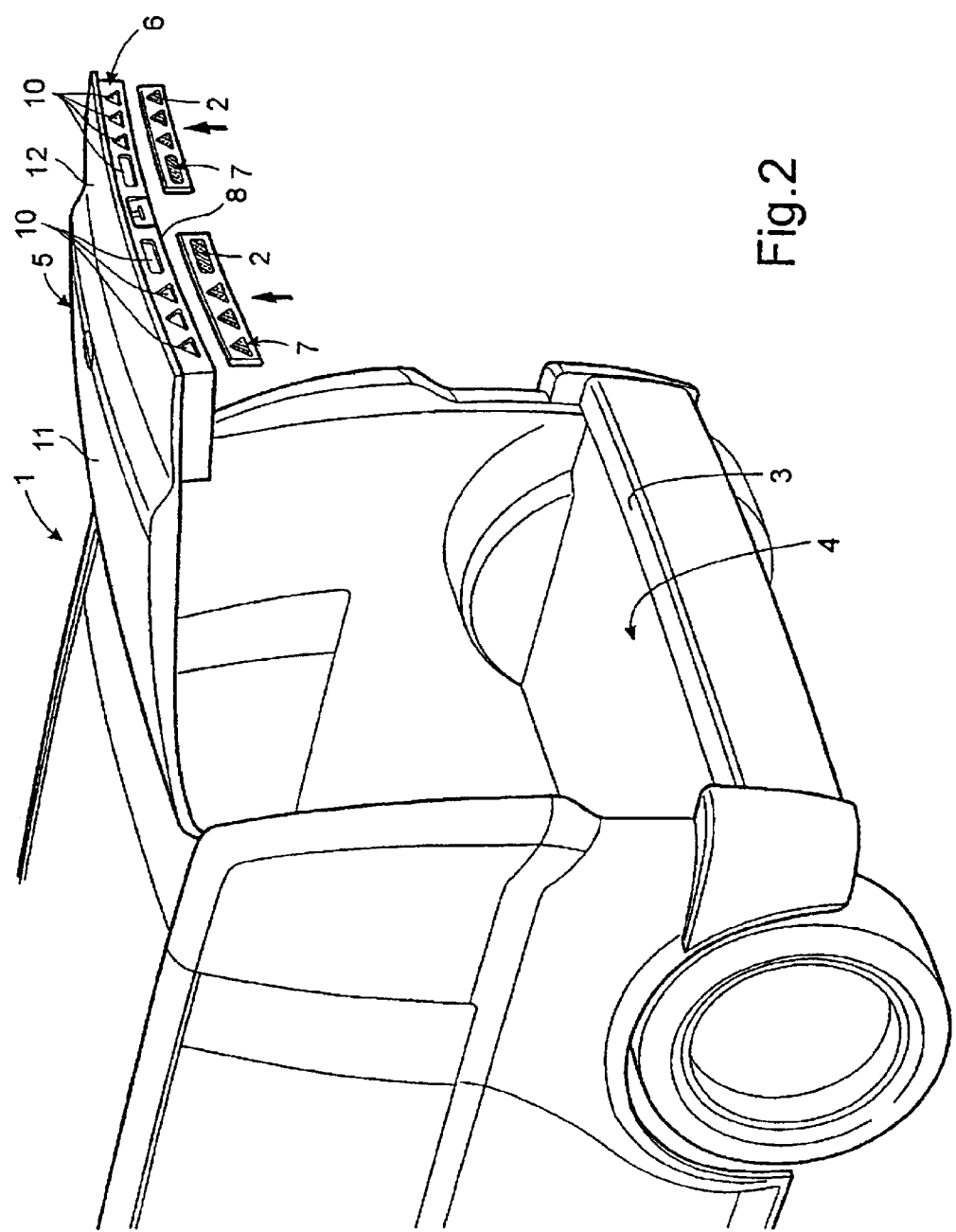
FIG. 2 shows a partial, perspective view of an alternative embodiment of the invention where one leg of the fold-up warning triangles is only partially covered with reflective material in a pattern corresponding to the shape of the holes which are formed in the walls of the recesses.

In the embodiment shown in FIG. 1, the boundary walls 9 of the recesses 8 are interrupted by four holes 10 arranged alongside each other, of which three are triangle-shaped as a symbolic representation of the shape of the warning signal 2 in its deployed position. In the examples shown, the fourth hole 10 in each recess 8 is rectangular in order to illustrate that the holes may be of any shape. FIGS. 1 to 3 show that the warning surface 7, visible through the holes 10 in FIG. 3, is substantially oriented at right angles to a road surface (not shown) when the rear hatch 5 is open. The warning surfaces 7 are immediately visible to other traffic behind the vehicle when the rear hatch 5 is opened. When the rear hatch 5 is closed again, the reflective warning surfaces 7 are no longer visible from outside the vehicle, as is shown in FIG. 4.

In the embodiment shown in FIG. 1, that side of the leg of the warning triangle 2 directed towards the holes 10 when the warning triangle 2 is releasably fitted into the recess 8 is essentially completely coated with reflective material. The boundary walls 9 and the holes 10 thus constitute slides of desired shape—preferably symbols of a warning triangle— through which a reflective warning surface 7 of the said shape is visible.

FIG. 2 shows an alternative embodiment in which the side of the leg of the warning triangles 2 is only partially covered with reflective material, according to a pattern directly corresponding to the shape of the holes 10.

As the vehicle 1 illustrated is provided with two fold-up warning triangles 2, it is possible in an emergency for one of these to be removed from its recess 8, deployed and placed on the roadway at a prescribed distance behind the vehicle. At the same time the second warning triangle 2 is left folded in its recess 8, whereby a warning to following traffic is also given locally from the vehicle when the rear hatch 5 is left in its opened position. Such an application of the two warning triangles 2 has a favorable and road safety-enhancing effect.

As has already been mentioned, the folded warning triangles 2 are releasably placed in the recesses 8. The warning triangles 2 are held in the recesses 8 by means of snap-fitting members in the form of a clip or the like, in such a way that they can easily be removed from the recesses 8.

A fold-up warning triangle 2 may be secured in the front part of the vehicle in the same way as has been described above. In such an embodiment, the recesses can be situated in the front part of the engine hood (not shown). Likewise, a warning triangle 2 may be placed in a vehicle door (not shown).

The invention is not limited to the illustrative embodiments described above and shown in the drawings, but may be varied within the scope of the attached patent claims.

What is claimed is:

1. A motor vehicle designed to carry a fold-up wanting triangle which can be removed from the vehicle, the vehicle comprising:

an opening having a boundary edge;

a hatch for covering said opening, said hatch being arranged so that it can move between a closed position and an open position; and an edge portion of said hatch able to secure said at least one fold-up warning triangle in a folded-up position, said edge portion bearing against the boundary edge of the opening in the closed position of said hatch;

wherein a reflector material carried by said fold-up warning triangle is visible to other traffic when said hatch is in its position and said fold-up warning triangle is secured in the folded-up position within the edge portion.

2. The motor vehicle according to claim 1 wherein said reflector material carried by said fold-up warning triangle is situated on one of three legs of said fold-up warning triangle.

3. The motor vehicle according to claim 1, further comprising a recess in said edge portion of said hatch, said fold-up warning triangle being releasably fitted therein, said recess having a wall interrupted by at least one bole through which said reflector material carried by said fold-up triangle is visible to other traffic when said hatch is in its open position.

4. The motor vehicle according to claim 3 wherein said bole is triangle-shaped as a symbolic representation of the shape of said warning triangle in its deployed position.

5. The motor vehicle according to claim 3 wherein said wall of said recess is interrupted by a number of holes arranged alongside each other.

6. The motor vehicle according to claim 3 wherein said wall plane of said recess is interrupted by three holes arranged alongside each other.

7. The motor vehicle according to claim 1 wherein said reflector material is oriented essentially at right angles to a road surface used by the vehicle when said hatch is in its opened position.

8. The motor vehicle according to claim 1 wherein two fold-up warnings triangles are releasably fitted in respective recesses in said edge portion of said hatch.

9. A motor vehicle comprising a member that is selectably deployable between at least a first position and a second position, wherein the member includes at least a first foldable warning triangle recess formed therein, wherein the member is deployed in the first position and wherein a foldable warning triangle is at least partially disposed within the recess, at least a portion of the foldable warning triangle is observable from an exterior position of the motor vehicle and wherein the member comprises an edge portion of a hatch.

10. The motor vehicle of claim 9 wherein the member includes at least one opening disposed therethrough such that a portion of the foldable warning triangle is observable through such opening when the foldable warning triangle is disposed within the recess.

11. The motor vehicle of claim 10 wherein the at least a portion of the foldable warning triangle that is observable from an exterior position of the motor vehicle when the member is deployed in the first position is observable through the at least one opening.

12. The motor vehicle of claim 11 wherein the first position comprises an opened position and the second position comprises a closed position.

13. The motor vehicle of claim 12 wherein the member includes at least two recesses such that the member can accommodate at least two folded foldable warning triangles.

14. The motor vehicle of claim 12 wherein the at least one opening has a triangular shape.

* * * * *

UNITED STATES PATENT AND TRADEMARK OFFICE
CERTIFICATE OF CORRECTION

PATENT NO. : 6,763,778 B2
DATED : July 20, 2004
INVENTOR(S) : Åke Bergquist et al.

It is certified that error appears in the above-identified patent and that said Letters Patent is hereby corrected as shown below:

Title page,
Item [73], Assignee, delete "Gothenburg" and insert -- Göteborg --;

Column 4,
Line 24, delete "bole" and insert -- hole --; and
Line 37, delete "warnings" and insert -- warning --.

Signed and Sealed this

Eighth Day of February, 2005

JON W. DUDAS
*Director of the United States Patent and Trademark Office*